(12) United States Patent
Guichard

(10) Patent No.: US 10,508,869 B2
(45) Date of Patent: Dec. 17, 2019

(54) METHOD FOR EVALUATING LIFTING FORCE IN A HEAT EXCHANGER

(71) Applicants: Alfa Laval Corporate AB, Lund (SE); Alfa Laval Packinox, Paris (FR)

(72) Inventor: Laure Guichard, Essertenne (FR)

(73) Assignees: ALFA LAVAL CORPORATE AB, Lund (SE); ALFA LAVAL PACKINOX, Paris (FR)

( * ) Notice: Subject to any disclaimer, the term of this patent is extended or adjusted under 35 U.S.C. 154(b) by 202 days.

(21) Appl. No.: 15/683,959

(22) Filed: Aug. 23, 2017

(65) Prior Publication Data

US 2018/0058768 A1 Mar. 1, 2018

(30) Foreign Application Priority Data

Aug. 30, 2016 (EP) .................................... 16186360

(51) Int. Cl.
*F28D 15/06* (2006.01)
*F28D 15/02* (2006.01)

(52) U.S. Cl.
CPC ...... *F28D 15/06* (2013.01); *F28D 2015/0216* (2013.01)

(58) Field of Classification Search
None
See application file for complete search history.

(56) References Cited

U.S. PATENT DOCUMENTS 5,474,584 A 12/1995 Beckwith et al.

FOREIGN PATENT DOCUMENTS

| CN | 1605385 A | * | 4/2005 | |
| CN | 102539284 B | | 4/2014 | |
| CN | 104197652 A | | 12/2014 | |
| GB | 2036572 A | * | 7/1980 | ............... C11B 3/14 |
| GB | 2036572 A | | 7/1980 | |
| SU | 1372571 A1 | * | 2/1988 | |
| SU | 1732001 A2 | * | 5/1992 | |

* cited by examiner

*Primary Examiner* — Matthew D Krcha
(74) *Attorney, Agent, or Firm* — Buchanan Ingersoll & Rooney PC

(57) ABSTRACT

A method and a control unit for evaluating lifting force of a gas phase of a substantially vertical upward two-phase flow of a first fluid in a heat exchanger. The first fluid comprises the gas phase and a liquid phase. The method comprises determining that the lifting force of the gas phase is insufficient for lifting the liquid phase based on hot end approach of the heat exchanger and/or on pressure drop of the first fluid over the heat exchanger. The control unit is configured to determine that the lifting force of the gas phase is insufficient for lifting the liquid phase based on hot end approach of the heat exchanger and/or on pressure drop of the first fluid over the heat exchanger. A heat exchanger assembly comprising a heat exchanger and the control unit.

10 Claims, 5 Drawing Sheets

METHOD FOR EVALUATING LIFTING FORCE IN A HEAT EXCHANGER

TECHNICAL FIELD

The invention relates to a method and a control unit for evaluating lifting force of a gas phase of a substantially vertical upward two-phase flow of a first fluid in a heat exchanger and a heat exchanger assembly comprising a heat exchanger and the control unit.

BACKGROUND ART

Some heat exchangers are operating with a vertical two-phase flow of at least one of the fluids, which comprises a gas phase and a liquid phase typically distributed as droplets in the gas phase. For example in catalytic reforming a preheating heat exchanger is used in which an upward flow of liquid naphtha and recycled gaseous hydrogen is heated by the effluent from the reforming reactor. The effluent comprises e.g. reformates and hydrogen.

The liquid phase of the fluid must be driven upwards by the gas phase of the fluid. Thus, in order to move the liquid phase upwards, on each droplet of the liquid phase the aerodynamic lifting force must be greater than the gravitational force or if the droplet is in contact with the wall greater than the sum of the gravitational force and the frictional force of the wall. The lifting force of the gas phase acting on the liquid phase must be larger than the gravitational force and possibly the frictional force acting on the liquid phase.

The lifting force is dependent on for example the fluid and its characteristics, the geometry of the flow path of the fluid through the heat exchanger and the operating conditions, such as temperature, pressure, flow rates, etc.

Sufficient lifting force can be obtained by e.g. having a high flow rate of the gas phase and a high temperature of the fluid. Also a heavy gas having a high molar mass in the gas phase increases the lifting force.

However, to obtain a high efficiency and a low pressure drop the temperature and molar mass should preferably be kept down. There are also constraints, such as pressure drop and compressor limitations, that incite operators to lower the gas flow rate. Thus, it is optimal to regulate the parameters such that lifting force is sufficient but not unnecessarily excessive. Further, it is important to obtain a good distribution of fluids over the heat exchanging area of a heat exchanger to improve the efficiency and avoid mechanical damages. Consequently, there is a need for optimizing the operating parameters such that a sufficient lifting force of the gas phase is obtained.

SUMMARY

One object of the invention is to enable optimization of operating parameters. One object of the invention is to improve efficiency of a heat exchanger. One object is to enable increased efficiency of a heat exchanger with satisfactory lifting force. One object is to avoid interruption of a heat exchanging process and breakdowns of heat exchanging equipment. One object is to anticipate operating problems. One object is to detect insufficient lifting force.

These and further objects are achieve by a method for evaluating lifting force of a gas phase of a substantially vertical upward two-phase flow of a first fluid in a heat exchanger. The first fluid comprises the gas phase and a liquid phase. The method comprises determining that the lifting force of the gas phase is insufficient for lifting the liquid phase based on hot end approach of the heat exchanger and/or on pressure drop of the first fluid over the heat exchanger. By determining that the lifting force is insufficient it is possible to identify and foresee problematic, harmful and inefficient operation of the heat exchanger. When it is determined that the lifting force is insufficient the operating parameters, such as the flow rate of the gas phase and the inlet temperatures of the liquid phase and the gas phase, could be adjusted to increase the lifting ratio and thereby increase the efficiency of the process, reduce the wear on the equipment and avoid interruption of the process and breakdown. Breakdown and unnecessary wear can also be avoided by stopping the process. Preferred variants of the method are defined in the associated dependent claims.

The above and further objects as well as the above advantages and effects are also achieved by a control unit for evaluating lifting force of a gas phase of a substantially vertical upward two-phase flow of a first fluid in a heat exchanger. The first fluid comprises the gas phase and a liquid phase. The control unit is configured to determine that the lifting force of the gas phase is insufficient for lifting the liquid phase based on hot end approach of the heat exchanger and/or on pressure drop of the first fluid over the heat exchanger. The control unit may implement any of the variants of the method defined in the dependent claims related to the method.

The above and further objects as well as the above advantages and effects are also achieved by a heat exchanger assembly comprising a heat exchanger and the above control unit. The heat exchanger comprises a partition separating the first fluid from a second fluid and defining a heat exchanger area transferring heat from the second fluid to the first fluid. The heat exchanger comprises a first inlet and a first outlet arranged to allow the first fluid to flow on a first side of the partition and a second inlet and a second outlet arranged to allow the second fluid to flow on a second side of the partition. The partition is arranged to allow substantially vertical upward flow of the first fluid. The heat exchanger assembly may implement any of the variants of the method defined in the dependent claims related to the method.

Still other objectives, features, aspects and advantages of the method, the control unit and the heat exchanger assembly will appear from the following detailed description as well as from the drawings.

BRIEF DESCRIPTION OF THE DRAWINGS

Embodiments of the invention will now be described with reference to the accompanying schematic drawings, in which.

DETAILED DESCRIPTION

As stated above, the present invention relates to a method for evaluating lifting force of a gas phase of a substantially vertical upward two-phase flow of a first fluid in a heat exchanger. The first fluid comprises the gas phase and a liquid phase. The first fluid flows upwards due to the raising force of the gas phase. The gas phase brings the liquid phase upwards. The invention aims at assisting in controlling the operating conditions such that the liquid phase is brought upwards through the heat exchanger by the gas phase. This is achieved by determining that the lifting force of the gas phase is insufficient for lifting the liquid phase based on hot end approach of the heat exchanger and/or on pressure drop of the first fluid over the heat exchanger. In other words, the determining if the lifting force of the gas phase is insufficient for lifting the liquid phase is either based on hot end approach of the heat exchanger or on pressure drop of the first fluid over the heat exchanger or on a combination of hot end approach of the heat exchanger and pressure drop of the first fluid over the heat exchanger. By determining that the lifting force is insufficient it is possible to identify and foresee problematic, harmful and inefficient operation of the heat exchanger. When it is determined that the lifting force is insufficient the operating parameters, such as the flow rate of the gas phase and the inlet temperatures of the liquid phase and the gas phase, should be adjusted to increase the lifting ratio or in critical situations it may even be necessary to stop the process. Thus, the determination of insufficient lifting increases efficiency, reduces wear and avoids interruption and breakdown. If it not is determined that the lifting force is insufficient, the operating parameters may be adjusted to optimize the process and improve the efficiency and the lifting force can be further evaluated to see if the lifting force is insufficient with the adjusted parameters.

The liquid phase of the first fluid must be driven upwards by the gas phase of the fluid. Thus, in order to move the liquid phase upwards, on each droplet of the liquid phase the aerodynamic lifting force must be greater than the gravitational force or if the droplet is in contact with the wall greater than the sum of the gravitational force and the frictional force. The lifting force of the gas phase acting on the liquid phase must be larger than the gravitational force and possibly the frictional force acting on the liquid phase. There can be determined a lifting ratio defined as the ratio between forces acting upwards on the liquid phase, such as the lifting force of the gas phase, and the forces acting downwards on the liquid phase, such as the gravitational force of the liquid phase and possibly the wall frictional force of the liquid phase. In order to have sufficient lifting, the lifting ratio should be larger than one.

Figure 1:
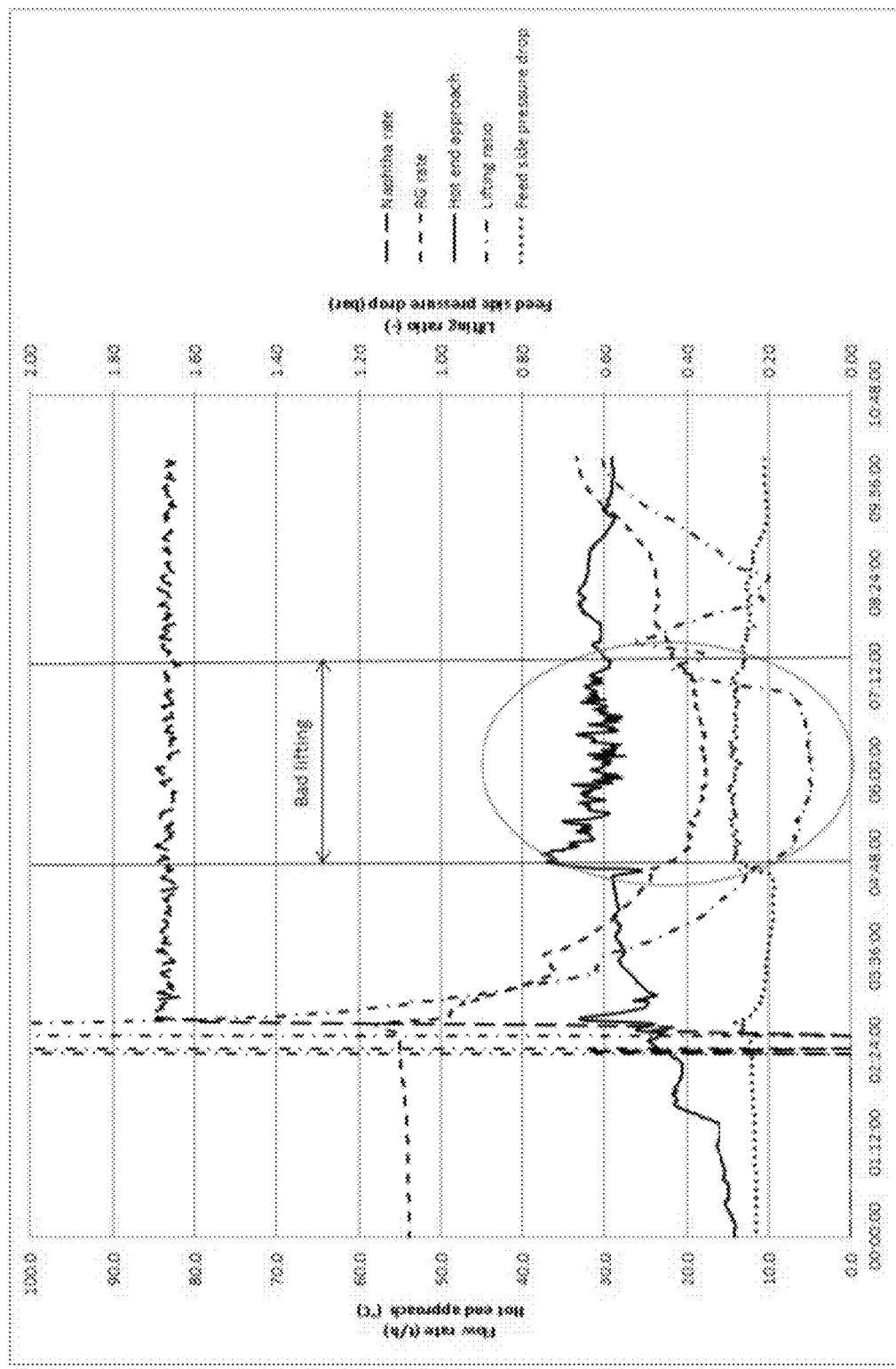
FIG. 1 is a graph of operating parameters of a heat exchanger operating with two-phase flow over time including a time period of unsatisfactory lifting.

FIG. 1 is a graph visualizing parameters during heat exchange over a plate and shell heat exchanger manufactured and sold under the name Packinox by the applicant. The heat exchanger operates as a preheater in catalytic reforming where an upwards flow of liquid naphtha and recycled gaseous hydrogen is heated by the effluent from a reforming reactor, which effluent comprises reformates and hydrogen. The graph of FIG. 1 includes a plot of the flow rate of liquid naphtha (Naphtha rate) in t/h (tonne/hour=1000 kg/hour), the flow rate of recycled gaseous hydrogen (RG rate) in t/h (tonne/hour=1000 kg/hour), the hot end approach in ° C., the lifting ratio calculated according to the below estimated actual lifting ratio (dimensionless) and the pressure drop over the heat exchanger for the mixed liquid naphtha and recycled gaseous hydrogen (Feed side pressure drop) in bar over time in minutes. FIG. 1 includes a region with unsatisfactory lifting, which is marked with Bad lifting.

Figure 2:
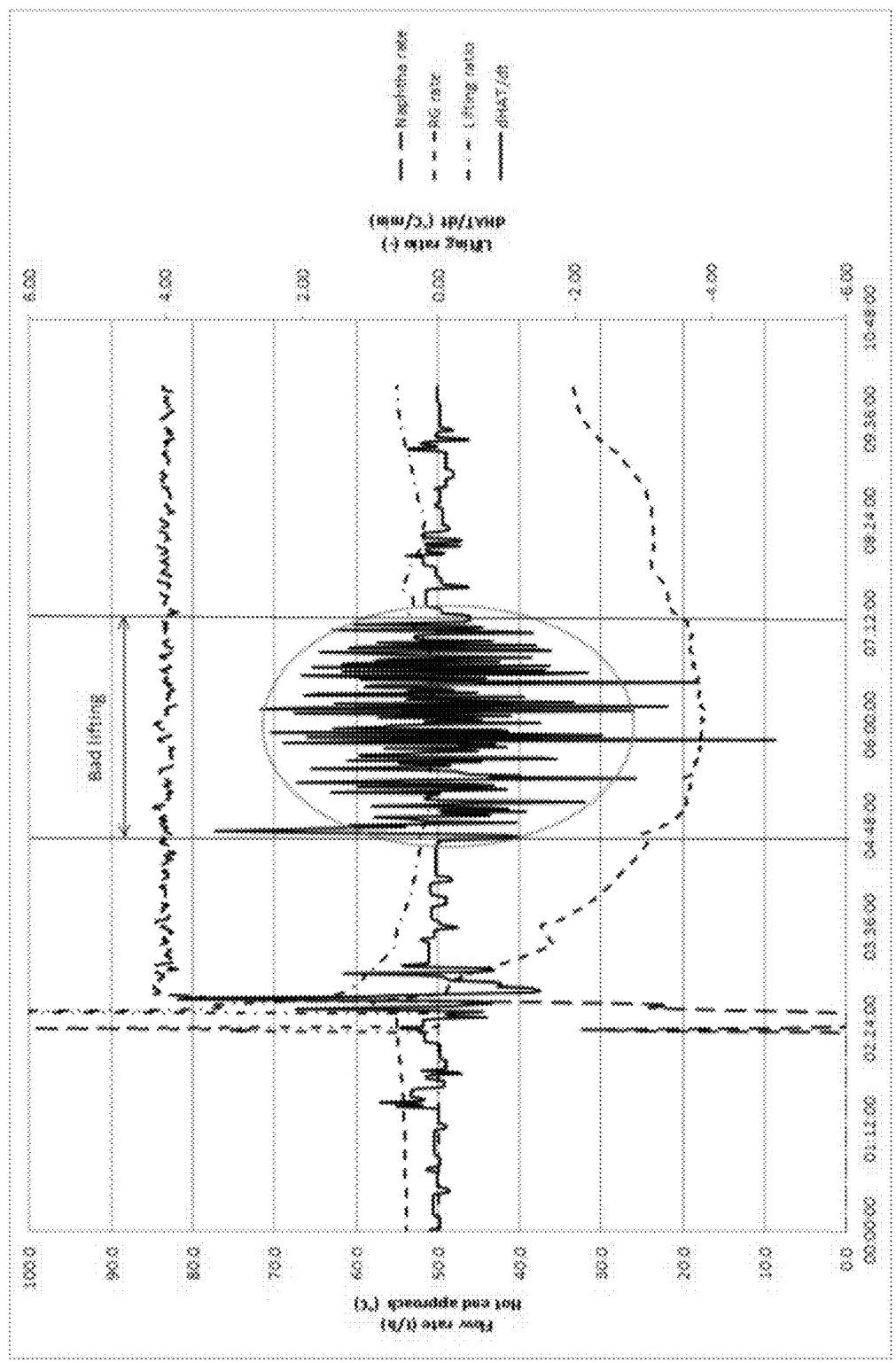
FIG. 2 is a graph of some of the operating parameters shown in FIG. 1, where also the time derivative of the hot end approach is shown.
Figure 3:
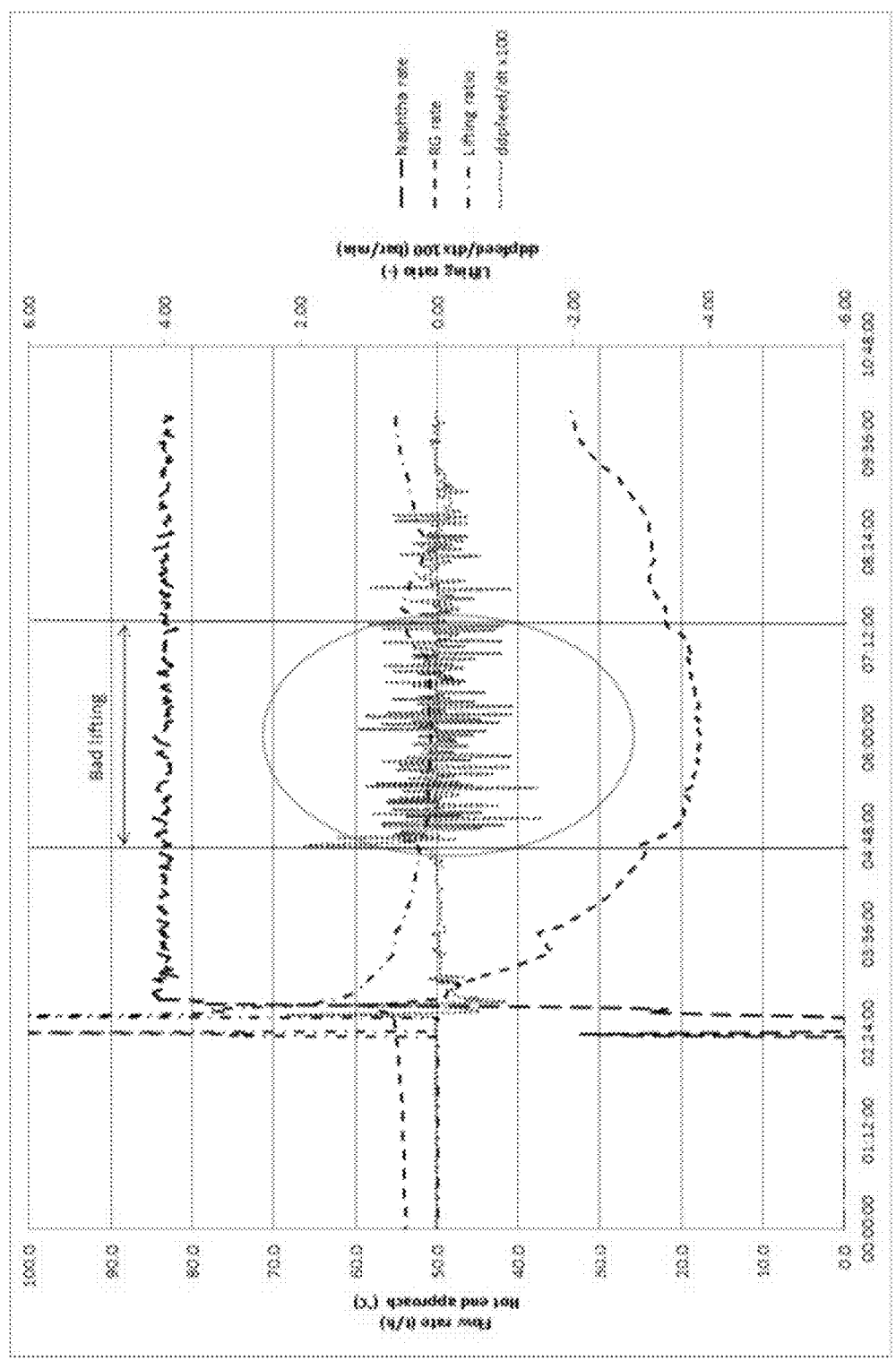
FIG. 3 is a graph of some of the operating parameters shown in FIG. 1, where also the time derivative of the pressure drop of the first fluid is shown.

FIG. 2 is a similar graph as FIG. 1 showing the flow rate of liquid naphtha, the flow rate of recycled gaseous hydrogen and the lifting ratio but also the time derivative of the hot end approach (dHAT/dt) in ° C./minute over time in minutes. FIG. 3 is also a similar graph as FIG. 1 showing the flow rate of liquid naphtha, the flow rate of recycled gaseous hydrogen and the lifting ratio but also the time derivative of the feed side pressure drop (ddpfeed/dt) multiplied with 100 in bar/minute over time in minutes.

When the lifting ratio decreases and thereby the lifting force becomes too small also the flow rate of the gas phase decreases as seen in FIG. 1. It has been found that the hot end approach as well as the pressure drop of the first fluid varies when the lifting force is too small as shown in FIG. 1. It has been realized that the hot end approach as well as the pressure drop of the first fluid can be used to indicate unsatisfactory lifting. The determining that the lifting force is insufficient may be based on the variation of the hot end approach and/or the variation of the pressure drop. If the variation of the hot end approach and/or the pressure drop is large it can be considered that the lifting force is insufficient. Major variations of the hot end approach and/or the pressure drop can be considered to indicate insufficient lifting force.

In one aspect, the determining that the lifting force is insufficient is based on the time derivative of the hot end approach and/or the time derivative of the pressure drop. The time derivate reflects the variation of the hot end approach and pressure drop, respectively, over time. Thus, the variation of the hot end approach and the pressure drop of the first fluid is identified by studying the time derivatives thereof and thereby it can be determined if the lifting is insufficient. The variation of the hot end approach and the pressure drop of the first fluid when the lifting force is too small is even more clear for the derivatives as seen in FIGS. 2 and 3 than for the hot end approach and pressure drop themselves visualized in FIG. 1. Thereby, the time derivative gives an improved evaluation of if the lifting is insufficient.

Figure 4:
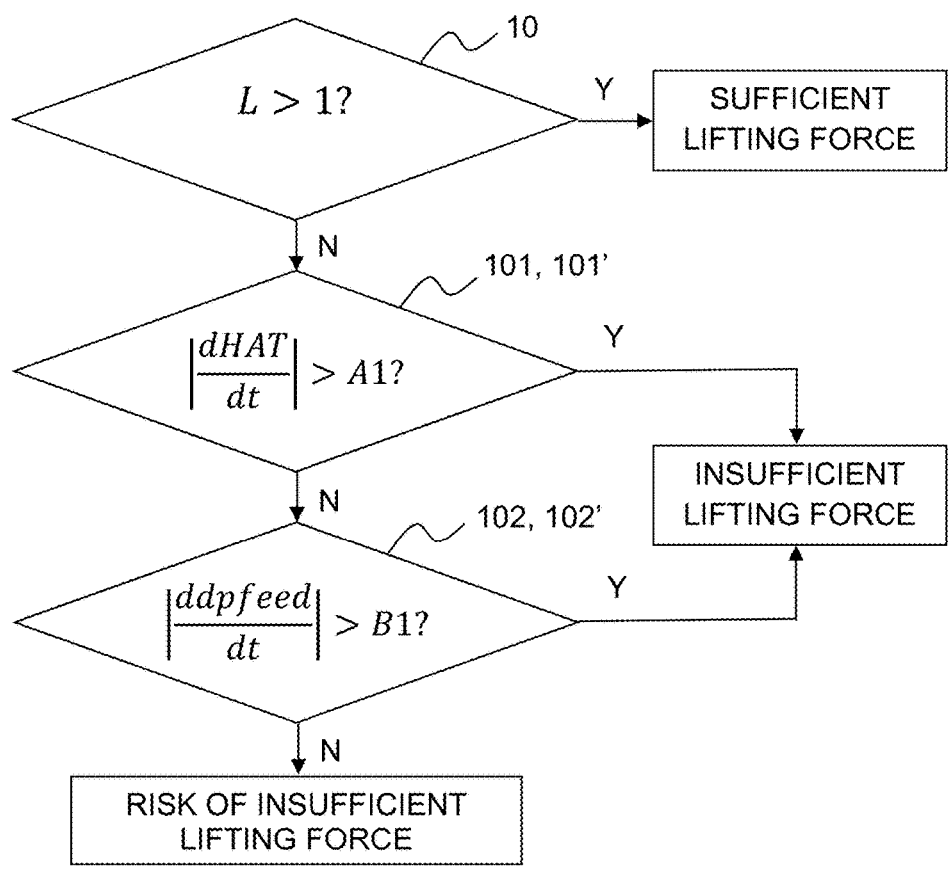
FIG. 4 is a flow chart of evaluation criteria according to one embodiment.
Figure 5:
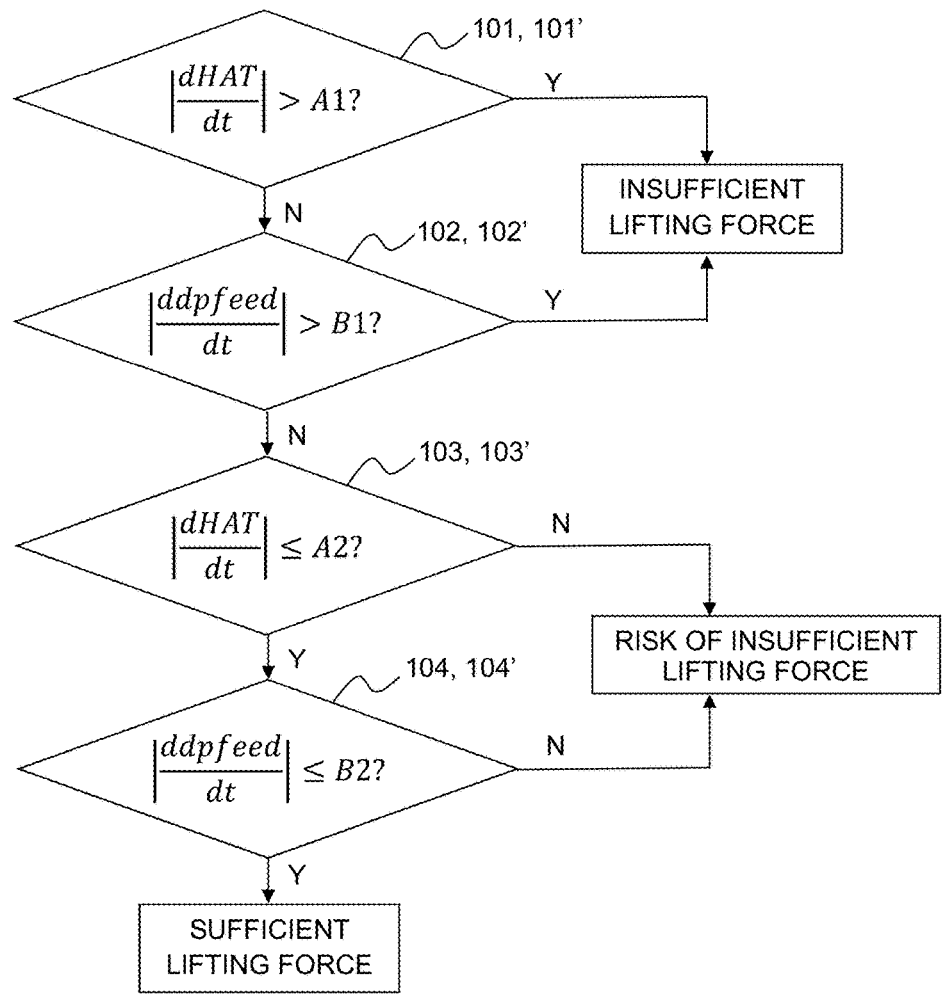
FIG. 5 is a flow chart of evaluation criteria for another embodiment.

In one aspect, it is determined that the lifting force is insufficient if the absolute value of the time derivative of the hot end approach exceeds a predefined primary threshold value (A1) (101) and/or if the absolute value of the time derivative of the pressure drop exceeds a predefined primary limit value (B1) (102). The time derivative is compared to a predefined value in order to evaluate if the variation is so great that the lifting force is insufficient. The time derivative of the hot end approach is compared to a predefined primary threshold value (A1). The time derivative of the pressure drop of the first fluid is compared to a predefined primary limit value (B1). It is not decisive if the hot end approach and the pressure drop is increasing or decreasing. It is the magnitude of the variation that is relevant to detect insufficient lifting and therefore the absolute value of the time derivative is studied. By comparing the time derivative of the hot end approach and/or the pressure drop with a specific restriction value gives an easy and reliable determination of if the lifting force is insufficient. In FIGS. 4 and 5 the criterion related that the absolute value of the time derivative of the hot end approach exceeds a predefined primary threshold value (A1) (101) is shown as fulfilled when |dHAT/dt|>A1 is confirmed and thereby answered with a Yes (Y). The criterion that the absolute value of the time derivative of the pressure drop exceeds a predefined primary limit value (B1) (102) is in FIGS. 4 and 5 shown as fulfilled when |ddpfeed/dt|>B1 is confirmed and thereby answered with a Yes (Y). Preferably, it is determined that the lifting force is insufficient if the absolute value of the time derivate of the hot end approach is greater than the predefined primary threshold value (A1) (101) or if the absolute value of the time derivative of the pressure drop of the first fluid is greater than the predefined primary limit value (B1) (102) or if both the absolute value of the time derivate of the hot end approach is greater than the predefined primary threshold value (A1) (101) and the absolute value of the time derivative of the pressure drop of the first fluid is greater than the predefined primary limit value (B1) (102). Thus, preferably it is determined that the lifting force is insufficient if any, i.e. at least one, of the criteria the absolute value of the time derivate of the hot end approach is greater than the predefined primary threshold value (A1) (101) and the absolute value of the time derivative of the pressure drop of the first fluid is greater than the predefined primary limit value (B1) (102) is fulfilled. This gives a strict determination of when the lifting force is insufficient that reduces the risk of not classify an insufficient lifting force as insufficient since it only is required that one of the two restriction value criteria related to hot end approach and pressure drop, respectively, is fulfilled. This strict determination of when the lifting force is insufficient is visualized in FIGS. 4 and 5, where it is described that when any of the criteria |dHAT/dt|>A1? (101) and |ddpfeed/dt|>B1? (102) is answered with a Yes it is determined that the lifting force is insufficient.

In one aspect, the time derivative is the first order time derivative or the second order time derivative. In one aspect, the time derivative is the first order time derivative. The first order time derivative of the hot end approach is shown in FIG. 2. The first order time derivative of the pressure drop of the first fluid is shown in FIG. 3.

The predefined primary threshold value (A1) for the first order time derivative may be 1° C./min. The predefined primary limit value (B1) for the first order time derivative may be 0.005 bar/min. These values have been found to be suitable restrictions for insufficient lifting.

In one aspect, the method further comprises determining that the lifting force risk being insufficient based on hot end approach and/or on pressure drop. The method can thereby indicate that there is a risk that the lifting force will be too low. As explained above and seen in FIG. 1, variations of the hot end approach and the pressure drop indicate reduced lifting and risk of insufficient lifting force. The determination of risk for insufficient lifting force gives the possibility to optimize the process. When it is determined that there is a risk for insufficient lifting the process should be monitored and the operating parameters should preferably be adjusted to increase the lifting force. Thereby, it is possible to avoid further decrease of the lifting ratio and to avoid problematic and inefficient operation as well as stoppage and interrupted operation.

In one aspect, the determining that the lifting force risk being insufficient is based on the time derivative of the hot end approach and/or the time derivative of the pressure drop. As explained above, the time derivative of the hot end approach and the pressure drop can be used to evaluate variations of the hot end approach and pressure drop of the first fluid and thereby to determine risk of insufficient lifting force.

In one aspect, it is determined that the lifting force risk being insufficient if the absolute value of the time derivative of the hot end approach is lower than the predefined primary threshold value (A1) (101') and/or if the absolute value of the time derivative of the pressure drop is lower than the predefined primary limit value (B1) (102'). The comparison of the time derivative of the hot end approach and/or the pressure drop with a restriction value gives an easy determination of if there exists a risk for insufficient lifting. In one aspect, it is determined that the lifting force risk being insufficient if the absolute value of the time derivative of the hot end approach is equal to or lower than the predefined primary threshold value (A1) (101') and/or if the absolute value of the time derivative of the pressure drop is equal to or lower than the predefined primary limit value (B1) (102'). In FIGS. 4 and 5 the criterion that the absolute value of the time derivative of the hot end approach is equal to or lower than the predefined primary threshold value (A1) (101') is shown as fulfilled when |dHAT/dt|>A1 is false and thereby answered with a No (N). The criterion that the absolute value of the time derivative of the pressure drop is equal to or lower than the predefined primary limit value (B1) (102') is in FIGS. 4 and 5 shown as fulfilled when |ddpfeed/dt|>B1 is false and thereby answered with a No (N). In FIG. 4, the determination that the criterion |dHAT/dt|>A1 is false and the criterion |ddpfeed/dt|>B1 is false is enough for concluding that the lifting force is in the risk zone of being insufficient, while in FIG. 5 further evaluation is performed. Preferably, it is determined that the lifting force risk being insufficient if both the absolute value of the time derivative of the hot end approach is lower than the predefined primary threshold value (A1) and the absolute value of the time derivative of the pressure drop is lower than the predefined primary limit value (B1). Thereby, it is determined that there is a risk for insufficient lifting if the time derivatives of both the hot end approach and the pressure drop are smaller than their respective restriction values, while it is determined that the lifting is insufficient if the time derivative of any of the hot end approach and the pressure drop exceeds its respective restriction value according to the above preferred version of determining that the lifting force is insufficient. This determination of when there is a risk for insufficient lifting force is visualized in FIGS. 4 and 5, where it is described that when both of the criteria |dHAT/dt|>A1? (101') and |ddpfeed/dt|>B1? (102') is answered with a No it is determined that the lifting force risk being insufficient. In FIG. 4, where it previously in the method has been concluded that the estimated actual lifting force not is larger than one (L not larger than 1, see further below), it is directly determined that there is a risk of insufficient lifting force when both of the criteria |dHAT/dt|>A1? (101') and |ddpfeed/dt|>B1? (102') is answered with a No. In FIG. 5, it is further evaluated if there is a risk of insufficient lifting force that requires actions or closer monitoring when both of the criteria |dHAT/dt|>A1? (101') and |ddpfeed/dt|>B1? (102') is answered with a No.

In one aspect, the method further comprises determining that the lifting force is sufficient based on hot end approach and/or on pressure drop. The determining that the lifting force is sufficient may be based on the variation of the hot end approach and/or the pressure drop of the first fluid. If the variation of the hot end approach and/or the variation of the pressure drop is small it can be considered that the lifting force is sufficient. Minor or absence of variations of the hot end approach and/or the pressure drop can be considered to indicate sufficient lifting force. Determination of that the lifting force is sufficient implies that the certainty of the operation of the process is increased. A determination showing that the lifting force is sufficient gives an indication of that the process is operating properly and that there is no need for adjusting the operating parameters for lifting force purposes. On the other hand, when it is determined that the lifting force is sufficient, the operating parameters can be adjusted in order to optimize the process and improve the efficiency and a further evaluation of the lifting force can be performed to determine if the lifting force still is sufficient or if the adjusted parameters have caused insufficient or risk for insufficient lifting force.

In one aspect, the determining that the lifting force is sufficient is based on the time derivative of the hot end approach and/or the time derivative of the pressure drop. The time derivate reflects the variation of the hot end approach and pressure drop, respectively, over time. Thus, the variation of the hot end approach and the pressure drop of the first fluid is identified by studying the time derivatives thereof and thereby it can be determined if the lifting is sufficient. The variation of the hot end approach and the pressure drop of the first fluid when the lifting force is too small compared to when the lifting force is acceptable is even more clear for the derivatives as seen in FIGS. 2 and 3 than for the hot end approach and pressure drop themselves visualized in FIG. 1 and thus the time derivative gives an improved evaluation of if the lifting is sufficient.

In one aspect, it is determined that the lifting force is sufficient if the absolute value of the time derivative of the hot end approach is lower than a predefined secondary threshold value (A2) (103) and/or if the absolute value of the time derivative of the pressure drop is lower than a predefined secondary limit value (B2) (104). The time derivative is compared to a predefined value in order to evaluate if the variation is so small that the lifting force is sufficient. The time derivative of the hot end approach is compared to a predefined secondary threshold value (A2) and the time derivative of the pressure drop of the first fluid is compared to a predefined secondary limit value (B2). It is not decisive if the hot end approach and the pressure drop is increasing or decreasing, but it is the magnitude of the variation that is relevant to detect sufficient lifting and therefore the absolute value of the time derivative is studied. By comparing the time derivative of the hot end approach and/or the pressure drop with a predefined restriction value gives an easy determination of if the lifting force is sufficient. The predefined secondary threshold value (A2) is lower than the predefined primary threshold value (A1), i.e. A2<A1, which is visualized in FIG. 6A. The predefined secondary limit value (B2) is lower than the predefined primary limit value (B1), i.e. B2<B1, which is visualized in FIG. 6B. In one aspect, it is determined that the lifting force is sufficient if the absolute value of the time derivative of the hot end approach is equal to or lower than a predefined secondary threshold value (A2) (103) and/or if the absolute value of the time derivative of the pressure drop is equal to or lower than a predefined secondary limit value (B2) (104). In FIG. 5 the criterion related that the absolute value of the time derivative of the hot end approach is equal to or lower than a predefined secondary threshold value (A2) (103) is shown as fulfilled when |dHAT/dt|≤A2 is confirmed and thereby answered with a Yes (Y). The criterion that the absolute value of the time derivative of the pressure drop is equal to or lower than a predefined secondary limit value (B2) (104) is in FIG. 5 shown as fulfilled when |ddpfeed/dt|≤B2 is confirmed and thereby answered with a Yes (Y). It is determined that the lifting force is sufficient if the absolute value of the time derivate of the hot end approach is smaller than the predefined secondary threshold value (A2) (103) or if the absolute value of the time derivative of the pressure drop of the first fluid is smaller than the predefined secondary limit value (B2) (104) or if both the absolute value of the time derivate of the hot end approach is smaller than the predefined secondary threshold value (A2) (103) and the absolute value of the time derivative of the pressure drop of the first fluid is smaller than the predefined secondary limit value (B2) (104). Preferably, it is determined that the lifting force is sufficient if both the absolute value of the time derivate of the hot end approach is smaller than the predefined secondary threshold value (A2) and the absolute value of the time derivative of the pressure drop of the first fluid is smaller than the predefined secondary limit value (B2). This latter criterion is more strict and reduces the risk of considering the lifting to be sufficient when it in reality not is sufficient since both subcriteria regarding hot end approach and pressure drop have to be fulfilled to give a determination concluding that the lifting is sufficient. When it is determined that the lifting force is sufficient, the operation can continue without any change of the operating conditions. This strict determination of when the lifting force is sufficient is visualized in FIG. 5, where it is described that when both of the criteria |dHAT/dt|≤A2? (103) and |ddpfeed/dt|≤B2? (104) is answered with a Yes it is determined that the lifting force is sufficient.

A relevant value of the predefined secondary threshold value (A2) for the first order time derivative may be 0.05° C./min. A relevant value of the predefined secondary limit value (B2) for the first order time derivative may be 0.001 bar/min.

In one aspect, it is determined that the lifting force risk being insufficient if the absolute value of the time derivative of the hot end approach exceeds the predefined secondary threshold value (A2) (103') and is lower than the predefined primary threshold value (A1) (101') and/or if the absolute value of the time derivative of the pressure drop exceeds the predefined secondary limit value (B2) (104') and is lower than the predefined primary limit value (B1) (102'). By determining that there is a risk for insufficient lifting force when the time derivative of the hot end approach and/or pressure drop is within a range between two restrictive values, the reliability of the determination is high. That it is determined that the lifting force risk being insufficient gives a strong incentive to monitor the operation conditions and preferably to adjust the operating parameters such that the lifting force is increased. Thereby, the efficiency of the process can be increased and wear, interruptions and breakdowns can be avoided. In one aspect, it is determined that the lifting force risk being insufficient if the absolute value of the time derivative of the hot end approach exceeds the predefined secondary threshold value (A2) (103') and is equal to or lower than the predefined primary threshold value (A1) (101') and/or if the absolute value of the time derivative of the pressure drop exceeds the predefined secondary limit value (B2) (104') and is equal to or lower than the predefined primary limit value (B1) (102'). In FIG. 5 the criterion that the absolute value of the time derivative of the hot end approach is equal to or lower than the predefined primary threshold value (A1) (101') is shown as fulfilled when |dHAT/dt|>A1 is false and thereby answered with a No (N) and the criterion that the absolute value of the time derivative of the hot end approach exceeds the predefined secondary threshold value (A2) (103') is shown as fulfilled when |dHAT/dt|≤A2 is false and thereby answered with a No (N). In FIG. 5 the criterion that the absolute value of the time derivative of the pressure drop is equal to or lower than the predefined primary limit value (B1) (102') is shown as fulfilled when |ddpfeed/dt|>B1 is false and thereby answered with a No (N) and the criterion that the absolute value of the time derivative of the pressure drop exceeds the predefined secondary limit value (B2) (104') is shown as fulfilled when |ddpfeed/dt|≤B2 is false and thereby answered with a No (N).

In this aspect, it is determined that the lifting force risk being insufficient if the absolute value of the time derivative of the hot end approach falls within the range between the predefined secondary threshold value (A2) and the predefined primary threshold value (A1), possibly including the predefined primary threshold value (A1), and/or if the absolute value of the time derivative of the pressure drop falls within the range between the predefined secondary limit value (B2) and the predefined primary limit value (B1), possibly including the predefined primary limit value (B1). It is determined that there is a risk for the lifting force to be insufficient if it not is determined that the lifting force is insufficient and not is determined that the lifting force is sufficient. Preferably, it is determined that the lifting force risk being insufficient if any, i.e. at least one of, the criteria that the absolute value of the time derivative of the hot end approach exceeds the predefined secondary threshold value (A2) (103') and the absolute value of the time derivative of the pressure drop exceeds the predefined secondary limit value (B2) (104') and both the absolute value of the time derivative of the hot end approach is lower than the predefined primary threshold value (A1) (101') and the absolute value of the time derivative of the pressure drop is lower than the predefined primary limit value (B1) (102'). This determination of when the lifting force risk being insufficient is visualized in FIG. 5, where it is described that when both of the criteria |dHAT/dt|>A1? (101') and |ddpfeed/dt|>B1? (102') is answered with a No and any of the criteria |dHAT/dt|≤A2? (103') and |ddpfeed/dt|≤B2? (104') is answered with a No it is determined that the lifting force is insufficient.

A notification may be created when the criterion for insufficient lifting or when the criterion for risk of insufficient lifting is met. A first notification may be created directly when the criterion for insufficient lifting or when the criterion for risk of insufficient lifting is met. A second notification may be created when the criterion for insufficient lifting or when the criterion for risk of insufficient lifting has been met for a predefined time period, such as for 1 hour, such as for 30 minutes, such as for 15 minutes, such as for 10 minutes, such as for 5 minutes, such as for 3 minutes, such as for 1 minute. A second notification may be created when the criterion for insufficient lifting or when the criterion for risk of insufficient lifting has been met all the time during a predefined time period or when the criterion for insufficient lifting or when the criterion for risk of insufficient lifting has been met during at least a specific portion of the predefined time period, such as at least during 50%, such as at least during 60%, such as at least during 70%, such as at least during 80%, such as at least during 90%, such as at least during 95%, of the predefined time period. A warning notification may be created when the criterion for risk of insufficient lifting is met. An alarm notification may be created when the criterion for insufficient lifting is met.

As mentioned above, lifting ratio is defined as the ratio between forces acting upwards on the liquid phase and forces acting downwards on the liquid phase. In order to have sufficient lifting, the lifting ratio should be larger than one. It is possible to calculate the lifting ratio in design conditions since the necessary data is available. To determine the actual lifting ratio, the actual operating conditions have to be measured. However, it is difficult to measure and obtain all actual operating parameters for the actual operating condition. It has been realized that an estimation of the actual lifting ratio can be obtained by calculating the lifting ratio in design conditions and correct the result using a comparison between the design and the actual conditions. The estimated actual lifting ratio can be determined by $$L = L_{base} \times \left[ \left( \frac{p_{RG}^{actual}}{p_{RG}^{design}} \right)^{K_{P_{RG}}} \times \left( \left( \frac{Q_{RG}^{actual}}{Q_L^{actual}} \right) \div \left( \frac{Q_{RG}^{design}}{Q_L^{design}} \right) \right)^{K_{ratio}} \times \left( \frac{MW_{RG}^{actual}}{MW_{RG}^{design}} \right)^{K_{MW_{RG}}} + K_{T_L} \times \left( T_L^{actual} - T_L^{design} \right) + K_{T_{RG}} \times \left( T_{RG}^{actual} - T_{RG}^{design} \right) \right]$$

where $L_{base}$ is the lifting ratio calculated in design conditions but with actual operating flow rate, $p_{RG}$ is the pressure of gas phase at the first inlet to the heat exchanger (recycle gas pressure), $Q_{RG}$ is the mass flow rate of the gas phase at the first inlet to the heat exchanger (recycle gas flow rate), $Q_L$ is the mass flow rate of the liquid phase at the first inlet to the heat exchanger (liquid feed flow rate), $MW_{RG}$ is the molar mass of the gas phase at the first inlet to the heat exchanger (recycle gas molar mass), $T_{RG}$ is the temperature of the gas phase at the first inlet to the heat exchanger (recycle gas inlet temperature), $T_L$ is the temperature of the liquid phase at the first inlet to the heat exchanger (liquid feed inlet temperature). The exponent "design" denotes parameters (pressure, mass flow rate, molar mass and temperature) in design conditions and parameters with the exponent "actual" are the corresponding measured parameters. K are constants specific for the process.

The determination of too low or risk for too low lifting force, such as the determination that the lifting force is insufficient and the determination that the lifting force risk being insufficient, may be combined with the criterion for the estimated actual lifting ratio, L. In particular may the determination that the lifting force is insufficient and the determination that the lifting force risk being insufficient if the absolute value of the time derivative of the hot end approach is lower than the predefined primary threshold value (A1) and/or if the absolute value of the time derivative of the pressure drop is lower than the predefined primary limit value (B1), be combined with the criterion for the estimated actual lifting ratio, L. Analysis including determination of if the estimated actual lifting force is larger than one, L>1? (10), is shown in FIG. 4. If the estimated actual lifting ratio L is found to be higher than 1, i.e. L>1, then it can be concluded that the lifting force is sufficient and that the operation can continue without any change of the operating conditions. If the estimated actual lifting ratio L is found to be lower than 1, the lifting is further evaluated based on the hot end approach and/or the pressure drop. Then, it is determined that the lifting force is insufficient if the absolute value of the time derivate of the hot end approach is greater than the predefined primary threshold value (A1) or if the absolute value of the time derivative of the pressure drop of the first fluid is greater than the predefined primary limit value (B1) or if both the absolute value of the time derivate of the hot end approach is greater than the predefined primary threshold value (A1) and the absolute value of the time derivative of the pressure drop of the first fluid is greater than the predefined primary limit value (B1). Then, i.e. when it is determined that the lifting force is insufficient, measures to correct the operating conditions should be performed immediately or the process should be stopped. On the other hand, it is determined that the lifting force risk being insufficient if the absolute value of the time derivative of the hot end approach is lower than the predefined primary threshold value (A1) and/or if the absolute value of the time derivative of the pressure drop is lower than the predefined primary limit value (B1). Then, i.e. when it is determined that the lifting force risk being insufficient, the operation should be followed and monitored more closely and preferably should the operating conditions be changed to improve the lifting. In one aspect, if the estimated actual lifting ratio L is found to be equal to or lower than 1, the lifting is further evaluated based on the hot end approach and/or the pressure drop.

Determination that the lifting force is sufficient may be performed without evaluation criterion for the estimated actual lifting ratio, L. Such a determination is shown in FIG. 5.

Figure 6A:
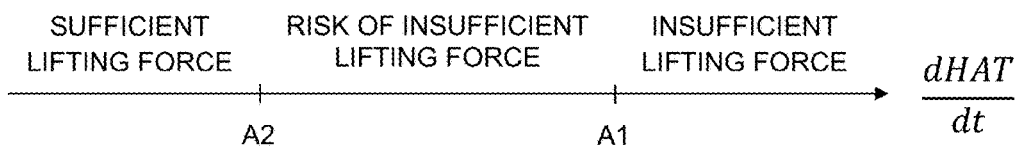
FIG. 6A is visualization of evaluation criteria for the hot end approach according to the embodiment of FIG. 5.
Figure 6B:
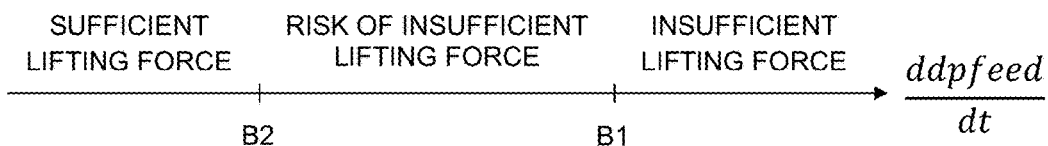
FIG. 6B is visualization of evaluation criteria for the pressure drop according to the embodiment of FIG. 5.

FIG. 6A visualizes the relation between the predefined primary threshold value (A1) and the predefined secondary threshold value (A2) for the time derivative of the hot end approach and the different regions for the criteria of insufficient, risk of insufficient and sufficient lifting force in a version, where only the time derivative of the hot end approach is considered. FIG. 6B visualizes the relation between the predefined primary limit value (B1) and the predefined secondary limit value (B2) for the time derivative of the pressure drop of the first fluid and the different regions for the criteria of insufficient, risk of insufficient and sufficient lifting force in a version, where only the time derivative of the pressure drop is considered.

The second fluid may have a higher temperature than the first fluid such that heat is transferred from the second fluid to the first fluid. The first fluid may flow on the cold side of the heat exchanger. The second fluid may flow on the warm side of the heat exchanger.

The lifting force of the gas phase of the first fluid acting on the liquid phase of the first fluid must be larger than the gravitational force and possibly the frictional force acting on the liquid phase at the first inlet of the heat exchanger. When the second fluid is warmer than the first fluid the lifting force will be increased during the flow of the first fluid through the heat exchanger and the liquid phase of the first fluid may even evaporate during flow of the first fluid through the heat exchanger.

The first fluid may consist of one fluid or be a mixture of fluids. The gas phase of the first fluid may comprise one fluid and the liquid phase of the first fluid may comprise the same fluid or a different fluid. The first fluid may comprise a primary subfluid and a secondary subfluid. The gas phase of the first fluid may comprise the primary subfluid and the liquid phase of the first fluid may comprise the secondary subfluid.

The heat exchanger may be a preheating heat exchanger in catalytic reforming. In a preheating heat exchanger in catalytic reforming an upward flow of liquid naphtha and recycled gaseous hydrogen is heated by the effluent from the reforming reactor. The effluent comprises e.g. reformates and hydrogen. In case of preheating in catalytic reforming the gas phase may comprise hydrogen and the liquid phase may comprise naphtha. In case of preheating in catalytic reforming the primary subfluid of the first fluid may be hydrogen and the secondary subfluid of the first fluid may be naphtha. Then the second fluid may be effluent from the reforming reactor, which comprises e.g. reformates and hydrogen.

In one aspect, the heat exchanger comprises a partition separating the first fluid from the second fluid. The partition defines a heat exchanger area transferring heat from the second fluid to the first fluid. The heat exchanger comprises a first inlet and a first outlet arranged to allow the first fluid to flow on a first side of the partition. The heat exchanger comprises a second inlet and a second outlet arranged to allow the second fluid to flow on a second side of the partition. The heat exchanger comprises a first passage from the first inlet to the first outlet. The heat exchanger comprises a second passage from the second inlet to the second outlet. The partition separates the first passage form the second passage. The partition may for example be a heat exchanger plate, preferably a plurality of heat exchanger plates or a heat exchanger tube, preferably a plurality of heat exchanger tubes, which tube(s) may be enclosed in a shell e.g. in the form of a pressure vessel. The heat exchanger may be any type of heat exchanger as long as it is operating with a substantially vertical flow for the first fluid. The heat exchanger may for example be a plate heat exchanger, a tube heat exchanger, a shell and plate heat exchanger or a plate and shell heat exchanger. The heat exchanger may for example be a welded heat exchanger, a brazed heat exchanger or a gasketed heat exchanger.

The first inlet may comprise two first subinlets, where the gas phase enters one of the subinlets and the liquid phase enters the other subinlet. The gas phase and the liquid phase may be mixed shortly after entering the subinlets.

In one aspect, the method comprises measuring an outlet temperature of the first fluid at the first outlet, measuring an inlet temperature of the second fluid at the second inlet and calculating the hot end approach as the difference between the inlet temperature of the second fluid and the outlet temperature of the first fluid. The hot end approach is the difference between the inlet temperature of the second fluid and the outlet temperature of the first fluid.

In one aspect, the method comprises determining a pressure difference between an inlet pressure of the first fluid at the first inlet and an outlet pressure of the first fluid at the first outlet and setting the pressure drop as the determined pressure difference. In one aspect, the determining of a pressure difference comprises measuring a pressure difference between the inlet pressure of the first fluid at the first inlet and the outlet pressure of the first fluid at the first outlet. This measuring of a pressure difference could be performed by a differential pressure sensor. Alternatively, the determining of a pressure difference comprises measuring the inlet pressure of the first fluid at the first inlet, measuring the outlet pressure of the first fluid at the first outlet and calculating the pressure difference as the difference between the inlet pressure of the first fluid and the outlet pressure of the first fluid. The pressure drop of the first fluid is the difference between the inlet pressure of the first fluid and the outlet pressure of the first fluid, i.e. the difference between the inlet pressure of the first fluid at the first inlet and the outlet pressure of the first fluid at the first outlet.

In one aspect, the partition is substantially vertically arranged. By arranging the partition substantially vertical, the two-phase flow is substantially vertical. The partition is substantially vertically arranged over a substantial portion of the heat exchanger area. The partition is substantially parallel to a vertical axis.

In one aspect, the heat exchanger is operating with counter-current flow or cross flow.

As stated above, the present invention also relates to a control unit for evaluating lifting force of a gas phase of a substantially vertical upward two-phase flow of a first fluid in a heat exchanger. The first fluid comprises the gas phase and a liquid phase. The control unit is configured to determine that the lifting force of the gas phase is insufficient for lifting the liquid phase based on hot end approach of the heat exchanger and/or on pressure drop of the first fluid over the heat exchanger. The control unit may include the same aspects, features and alternatives as the method and may have the same advantages and effects as the method. The control unit may be a central control system controlling the operation of the heat exchanger or a process in which the heat exchanger is included or a control unit controlling and/or monitoring the heat exchanger. The control unit may include a processing unit of a conventional type and may be capable of carrying out instructions of a computer program. The control unit may also comprise a memory unit in which the predefined values (A1, A2, B1, B2) and/or the computer program may be stored. The method according to the various embodiments disclosed herein may be implemented by a data processing device, such as the control unit or the processing unit thereof.

As stated above, the present invention further relates to a heat exchanger assembly comprising a heat exchanger and a control unit according to above. In particular, the control unit is for evaluating lifting force of a gas phase of a substantially vertical upward two-phase flow of a first fluid in the heat exchanger. The first fluid comprises the gas phase and a liquid phase. The control unit is configured to determine that the lifting force of the gas phase is insufficient for lifting the liquid phase based on hot end approach of the heat exchanger and/or on pressure drop of the first fluid over the heat exchanger. The control unit may include the same aspects, features and alternatives as the method and may have the same advantages and effects as the method. The heat exchanger comprises a partition separating the first fluid from a second fluid and defining a heat exchanger area transferring heat from the second fluid to the first fluid. The heat exchanger comprises a first inlet and a first outlet arranged to allow the first fluid to flow on a first side of the partition and a second inlet and a second outlet arranged to allow the second fluid to flow on a second side of the partition. The partition is arranged to allow substantially vertical upward flow of the first fluid. The heat exchanger assembly may include the same aspects, features and alternatives as the control unit and the method and may have the same advantages and effects as the control unit and the method.

The foregoing has described the principles, preferred embodiments, aspects and modes of operation of the present invention. However, the description should be regarded as illustrative rather than restrictive, and the invention should not be limited to the particular embodiments and aspects discussed above. The different features of the various embodiments, aspects and versions of the invention can be combined in other combinations than those explicitly described. It should therefore be appreciated that variations may be made in those embodiments and aspects by those skilled in the art without departing from the scope of the present invention as defined by the following claims.

The invention claimed is:
1. A method comprising:
moving a first fluid substantially vertically upward in a heat exchanger, the first fluid being a two-phase flow comprising a gas phase and a liquid phase, the gas phase having a gas temperature and the liquid phase having a liquid temperature;
the gas phase applying a lifting force to the liquid phase, the lifting force acting in opposition to a downward force of the liquid phase;
determining that the lifting force of the gas phase is insufficient to lift the liquid phase based on whether a first absolute value of a time derivative of a hot end approach of the heat exchanger exceeds a predefined primary threshold value and/or on whether a second absolute value of a time derivative of pressure drop of the first fluid over the heat exchanger exceeds a predefined primary limit value; and
increasing at least one of a flow rate of the gas phase, the gas temperature or the liquid temperature to increase the lifting force of the gas phase when the determining determines that the first absolute value exceeds the predefined primary threshold value and/or when the determining determines that the second absolute value exceeds the predefined primary limit value.

2. The method according to claim 1, wherein the method further comprises determining that there is a risk of insufficient lifting force based on the time derivative of the hot end approach and/or on the time derivative of the pressure drop.

3. The method according to claim 2, wherein it is determined that there is the risk of insufficient lifting force if the absolute value of the time derivative of the hot end approach is lower than the predefined primary threshold value and/or if the absolute value of the time derivative of the pressure drop is lower than the predefined primary limit value.

4. The method according to claim 3, wherein it is determined that there is the risk of insufficient lifting force if the absolute value of the time derivative of the hot end approach exceeds the predefined secondary threshold value and is lower than the predefined primary threshold value and/or if the absolute value of the time derivative of the pressure drop exceeds the predefined secondary limit value and is lower than the predefined primary limit value.

5. The method according to claim 1, wherein the method further comprises determining that the lifting force is sufficient based on the time derivative of the hot end approach and/or on the time derivative of the pressure drop after the increasing at the least one of a flow rate of the gas phase, the gas temperature or the liquid temperature to increase the lifting force of the gas phase.

6. The method according to claim 5, wherein it is determined that the lifting force is sufficient if the absolute value of the time derivative of the hot end approach is lower than a predefined secondary threshold value and/or if the absolute value of the time derivative of the pressure drop is lower than a predefined secondary limit value.

7. The method according to claim 1, wherein
the heat exchanger comprises a partition separating the first fluid from a second fluid and defining a heat exchanger area transferring heat from the second fluid to the first fluid, wherein the heat exchanger comprises a first inlet and a first outlet arranged to allow the first fluid to flow on a first side of the partition and a second inlet and a second outlet arranged to allow the second fluid to flow on a second side of the partition, and
wherein the method further comprises measuring an outlet temperature of the first fluid at the first outlet, measuring an inlet temperature of the second fluid at the second inlet and calculating the hot end approach as the difference between the inlet temperature of the second fluid and the outlet temperature of the first fluid; and/or determining a pressure difference between an inlet pressure of the first fluid at the first inlet and an outlet pressure of the first fluid at the first outlet and setting the pressure drop as the determined pressure difference.

8. The method according to claim 7, wherein the partition is substantially vertically arranged.

9. The method according to claim 1, wherein the heat exchanger is operating with counter-current flow or cross flow.

10. A heat exchanger assembly comprising:

a heat exchanger comprising a partition separating a first fluid from a second fluid and defining a heat exchanger area transferring heat from the second fluid to the first fluid, wherein the heat exchanger comprises a first inlet and a first outlet arranged to allow the first fluid to flow on a first side of the partition and a second inlet and a second outlet arranged to allow the second fluid to flow on a second side of the partition, and wherein the partition is arranged to allow substantially vertical upward flow of the first fluid;

the first fluid being a two-phase flow comprising a gas phase and a liquid phase, the gas phase applying a lifting force to the liquid phase, the lifting force acting in opposition to a downward force of the liquid phase;

a control unit configured to determine that the lifting force of the gas phase is insufficient for lifting the liquid phase based on whether a first absolute value of a time derivative of a hot end approach of the heat exchanger exceeds a predefined primary threshold value and/or on whether a second absolute value of a time derivative of pressure drop of the first fluid over the heat exchanger exceeds a predefined primary limit value; and the heat exchanger is configured to increase at least one of a flow rate of the gas phase, the gas temperature or the liquid temperature to increase the lifting force of the gas phase when the determining determines that the first absolute value exceeds the predefined primary threshold value and/or when the determining determines that the second absolute value exceeds the predefined primary limit value.

\* \* \* \* \*